US007085692B2

(12) United States Patent
Jackson et al.

(10) Patent No.: US 7,085,692 B2
(45) Date of Patent: Aug. 1, 2006

(54) LEARNING SYSTEMS AND METHODS FOR MARKET-BASED CONTROL OF SMART MATTER

(75) Inventors: Warren B. Jackson, San Francisco, CA (US); Oliver P. Guenther, San Francisco, CA (US); Tad H. Hogg, Mountain View, CA (US); Bernardo A. Huberman, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 792 days.

(21) Appl. No.: 09/973,786

(22) Filed: Oct. 11, 2001

(65) Prior Publication Data

US 2003/0074166 A1 Apr. 17, 2003

(51) Int. Cl.
*G06F 17/10* (2006.01)

(52) U.S. Cl. .............................. 703/2; 706/23; 700/32; 700/31; 345/440

(58) Field of Classification Search .................... 703/2, 703/7; 700/32, 31, 28, 30, 44, 45, 29, 42, 700/97; 706/23; 382/173; 118/308; 345/440; 244/3.11
See application file for complete search history.

(56) References Cited

U.S. PATENT DOCUMENTS

| | | | | |
|---|---|---|---|---|
| 4,771,250 | A | 9/1988 | Statman et al. | |
| 4,775,949 | A | 10/1988 | Kalata | |
| 5,546,312 | A * | 8/1996 | Mozumder et al. | 700/97 |
| 5,602,761 | A | 2/1997 | Spoerre et al. | |
| 5,802,203 | A * | 9/1998 | Black et al. | 382/173 |
| 6,361,605 | B1 * | 3/2002 | Shutic et al. | 118/308 |
| 6,473,084 | B1 * | 10/2002 | Phillips et al. | 345/440 |
| 6,577,908 | B1 * | 6/2003 | Wojsznis et al. | 700/42 |
| 6,581,048 | B1 * | 6/2003 | Werbos | 706/23 |
| 6,725,208 | B1 * | 4/2004 | Hartman et al. | 706/23 |
| 6,807,448 | B1 * | 10/2004 | Suzuki et al. | 700/28 |
| 2001/0014834 | A1 * | 8/2001 | Shah | 700/29 |
| 2003/0028266 | A1 * | 2/2003 | Jacques | 700/32 |
| 2003/0065409 | A1 * | 4/2003 | Raeth et al. | 700/31 |
| 2004/0155142 | A1 * | 8/2004 | Muravez | 244/3.11 |

OTHER PUBLICATIONS

Narendra et al., “Adaptive control using multiple models”, IEEE 1997.*

Narenrda et al., “Adaptive control using multiple models, switching and tuning”, IEEE 2000.*

* cited by examiner

*Primary Examiner*—Kandasamy Thangavelu
(74) *Attorney, Agent, or Firm*—Oliff & Berridge, PLC

(57) ABSTRACT

A market based learning mechanism for controlling smart matter to learn an appropriate organizational control structure for a multiple actuator-sensor dynamical system for use in optimizing system control. The more successful one or more of a plurality of control methods are in predicting system operation, the more weight the successful methods are given in controlling the system.

11 Claims, 2 Drawing Sheets

FIG. 2
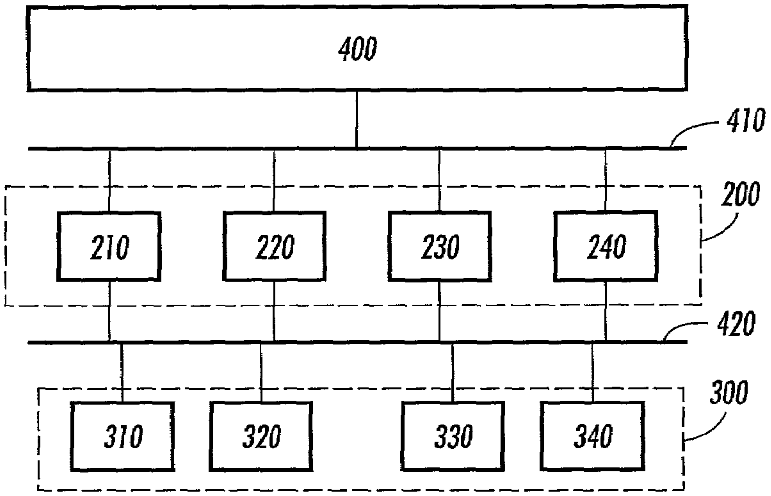
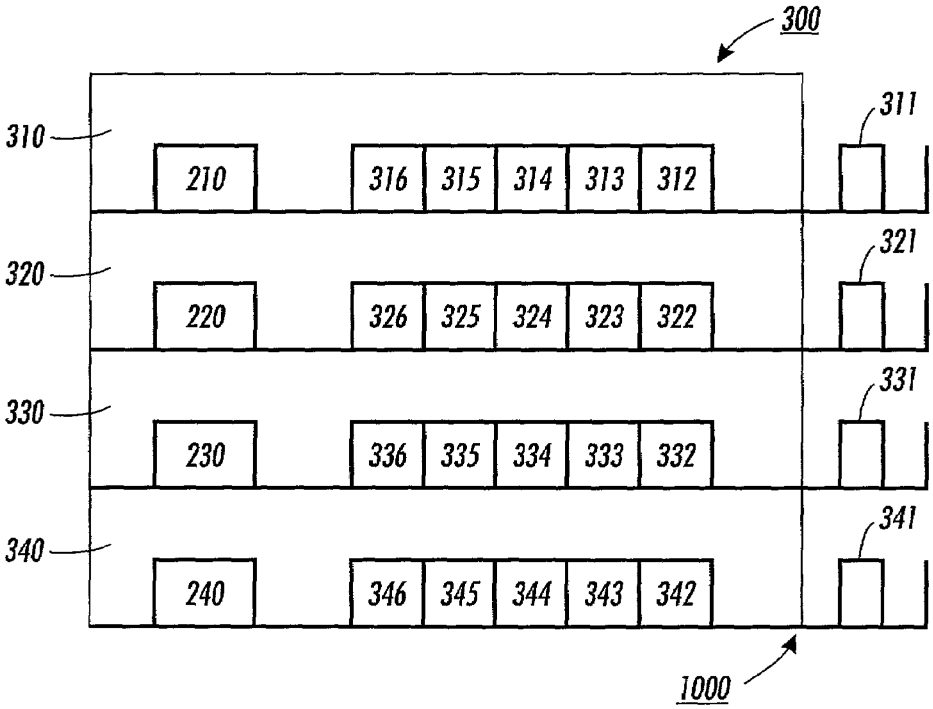
FIG. 3

LEARNING SYSTEMS AND METHODS FOR MARKET-BASED CONTROL OF SMART MATTER

BACKGROUND OF THE INVENTION

1. Field of Invention

This invention relates to systems and methods for controlling devices and processes.

2. Description of Related Art

Market-based controllers and adaptive multi-agent control systems are known. These controllers and systems include those disclosed in U.S. Pat. No. 6,119,052, which discloses a market-based controller for controlling the motion of an object on a transport assembly. The transport assembly is formed using sensors and actuators located close to each other. A control system controls motion of the object on the transport by allocating quantities of system resources to selected actuator units. The control system includes market agents, an actuator distributor and a market auctioneer. The market agents submit bids to purchase quantities of the system resource for selected ones of the actuator units. The actuator distributor specifies available quantities of the system resource for consumption by the actuator units.

The market auctioneer, which is coupled to the market agents and the actuator distributor, receives the bids submitted by the market agents and the available quantities of the system resource specified by the actuator distributor to allocate the system resource that satisfies an aggregation of the bids. To efficiently allocate a fixed amount of a system resource, such as air pressure, directed to the actuators, the market controller maps each market agent to points in space in the transport assembly, as well as points in time relative to a system clock. Using information gathered from the sensor sites, each market agent determines whether to bid on the fixed amount of the relevant system resource at each bid interval. Using the bids submitted by the market agents, a market equilibrium price and quantity are computed by a market auctioneer. The system resource, such as air pressure, purchased by each market agent is then distributed to the actuators mapped to each market agent.

U.S. Pat. No. 6,027,112 discloses an adaptive multi-agent control system for controlling object motion with smart matter. The multi-agent control system disclosed in the ’112 patent includes a learning mechanism that takes advantage of the proximate coupling between sensors and actuators. The learning mechanism improves system performance by making iterative changes to an interaction matrix that represents the organizational structure of the multi-agent control system.

SUMMARY OF THE INVENTION

However, conventional controllers and systems are subject to failures, delays and unpredictability in the coordination of a physical distribution system with many elements in real time, limited ability to accurately model such systems, and unpredictable system environments. This is especially prevalent, for example, in mass production of smart materials, where manufacturing tolerances and occasional defects will cause a particular physical system to differ somewhat from its nominal specification. These characteristics limit the effectiveness of conventional control algorithms, which rely on a single global processor with rapid access to the full state of the system and detailed knowledge of its behavior This invention provides systems and methods that use a market-based learning mechanism to allow new control strategies to be easily added to controllers and systems.

This invention provides systems and methods to allow dynamic selection of one or more models of a many-actuator, many sensor dynamic control system to improve overall system control.

This invention separately provides systems and methods that implement a more robust approach, use a collection of autonomous agents, each of which deals with a limited part of the overall control problem to improve overall system control.

In various exemplary embodiments of the systems and methods of this invention, individual agents can be associated with each sensor or actuator in the material, or with various aggregations of the sensors and/or actuators, to provide a mapping between the agents and their physical location. This establishes a community of agents which, in interactions, strategies, and competition for resources between the agents, function as distributed controls. The distributed control implemented by the agents allows the system as a whole to adapt to changes in the environment or to disturbances to individual components. Various exemplary embodiments use a market-based learning mechanism to control smart matter. In various exemplary embodiments, the market agents learn an appropriate organizational structure for the multi-agent smart matter control system through competition between a variety of individual control strategies used by different ones of the agents. The market-based mechanism allows new strategies to be easily added to the system. This facilitates continual experimentation and improvement. In various exemplary embodiments, a market-based procedure is used to select models of a many-actuator-sensor dynamical system for use in control.

The market-based procedure is more flexible and robust than standard model selection procedures. The market-based learning mechanism according to this invention enables the use of prior knowledge, increases parallelism, reduces the need for a central controller, and increases flexibility and robustness against actuator and/or sensor failure.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein:

FIG. 2 shows an exemplary embodiment of a multiple actuator-sensor smart matter dynamic control system according to this invention; and FIG. 3 is a schematic diagram of a multiple actuator smart matter dynamic control system according to this invention.

DETAILED DESCRIPTION OF PREFERRED EMBODIMENTS

Figure 1:
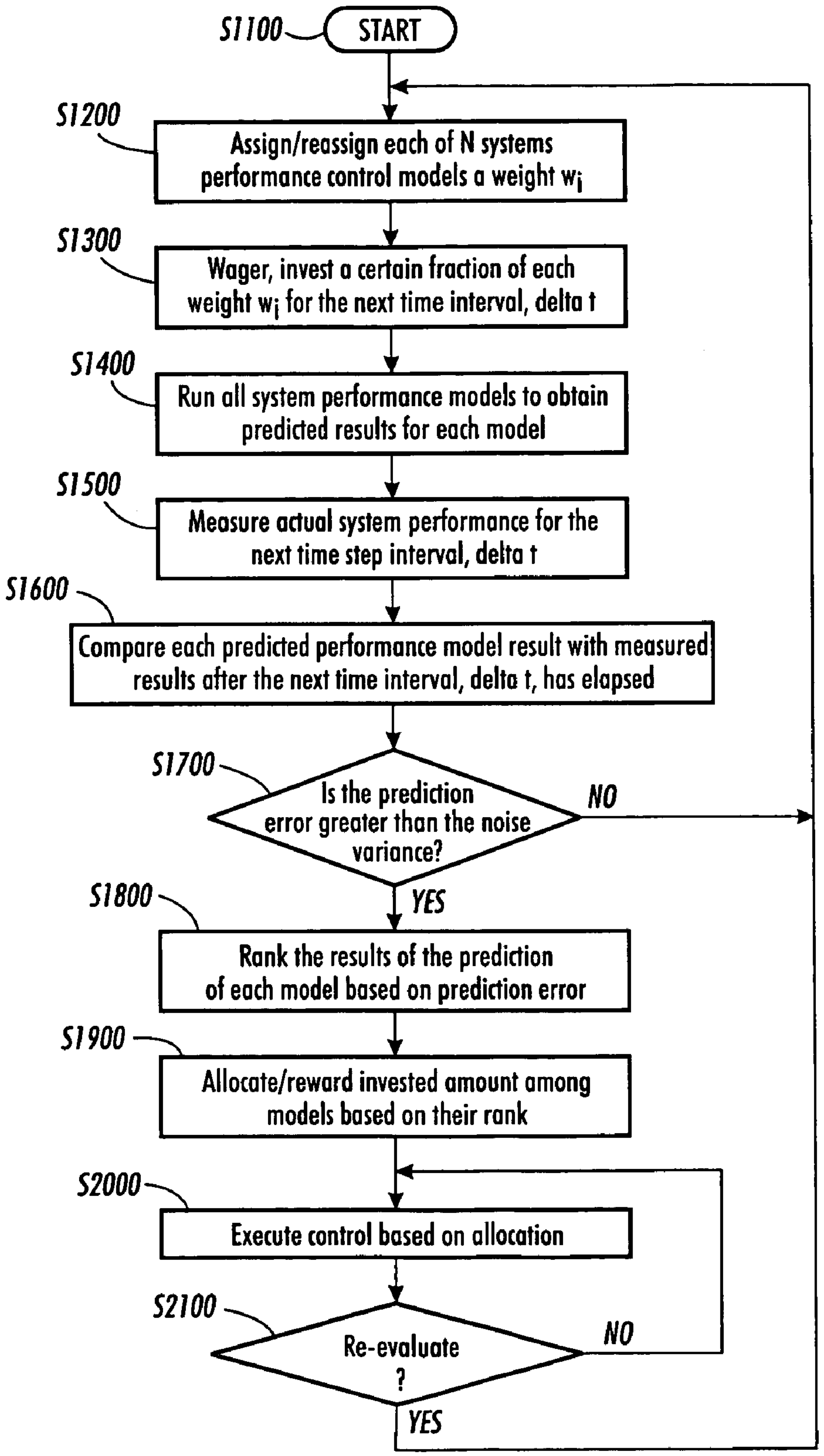
FIG. 1 is a flowchart outlining one exemplary method for making market-based model selection.

This invention provides systems and methods that use a market-based learning mechanism to control smart matter. Smart matter encompasses a physical system or material with arrays of microelectromechanical devices embedded in the physical system or material. The microelectromechanical devices detect and adjust to changes in ambient environment around each such microelectromechanical device. A microelectromechanical device can be embedded in a physical system or material by building such a micromechanical device directly into that material. This is in contrast to conventionally separately attaching a sensor to the material. Examples of microelectromechanical devices include for example, a photo-transistor portion of a monolithic integrated circuit, a piezoelectric element portion of a monolithic integrated circuit, and computers and actuators integrated into a portion of a monolithic integrated circuit. Smart matter can be used, for example, to control air handling, including air conditioning, in a home or office building. However, smart matter is not limited to this use, and can be used in any number of applications.

In general, each micromechanical device embedded in smart matter contains microscopic sensors, autonomous agents, actuators and controllers. A typical characteristic of smart matter is that the physical system includes large numbers, possibly thousands, of such microelectromechanical devices. These devices work together to deliver a higher level function, such as, for example, controlling air handling in a home or office building.

Embedding microscopic sensors, controllers and actuators into materials allows physical systems to actively monitor and respond to the ambient environment of the material and/or of the physical system in precisely controlled ways. This is particularly appropriate for microelectromechanical systems (MEMS) where the microelectromechanical devices are fabricated together using single silicon wafers. Other applications include environmental monitors, drag reduction in fluid flow, compact data storage and improved material properties. However, these examples are merely provided for explanatory purposes. The systems and methods according to this invention can be used in any number of other applications.

In many such applications, the relevant mechanical process are slow compared to sensor, decision-making and communication speeds, i.e., at the speeds of electromagnetic waves and electricity.

In a smart matter regime, controllers are usually able to execute many control routines within the time available for the smart matter to respond to mechanical changes. A significant difficulty in realizing smart matter's potential is developing the control routines. This is due to the need to robustly coordinate a physically distributed real-time response with many elements in the face of failure, delays, an unpredictable environment and a limited ability to accurately model the behavior of the system. This is especially true when mass producing smart materials where manufacturing tolerances and occasional defects can cause a physical system to differ somewhat from its nominal specification. These characteristics limit the effectiveness of conventional control algorithms, which rely on a single global processor with rapid access to the full state of the system and detailed knowledge of the behavior of the system.

Various exemplary embodiments of the systems and methods according to this invention use, instead of a central controller, a more robust approach for such systems. This approach uses a collection of autonomous agents that each deal with a limited part of the overall control problem. Individual agents can be associated with each sensor or actuator in the material, or with various aggregations of the sensors and/or actuators, to provide a mapping between the autonomous agents and their physical locations. This leads to a community of autonomous agents which, in the interactions, strategies, and competition for resources between the autonomous agents, resemble natural ecosystems. Distributed controls allow the system as a whole to adapt to changes in the environment or disturbances to individual components.

An autonomous agent learns an appropriate organizational structure through competition among a variety of individual control strategies. The market-based mechanism allows new strategies to be easily added to the system facilitating continual experimentation and improvement. New control strategies are added depending on the quality of existing strategies. If the existing strategies maintain the desired control within the errors of the system, new strategies are seldom developed. On the other hand, if the existing strategies do not control the system to the desired level, many new control strategies compete with the existing strategies for a greater degree of control.

Multiagent systems can be used in distributed problem solving. Multiagent systems can also be applied to problems involved in acting in the physical world, such as distributed traffic control, flexible manufacturing, the design of robotic systems, and self-assembly of structures. An exemplary embodiment of the systems and methods of this invention involves using multiagent systems to control smart matter. In particular, in such multiagent systems, there is a very tight coupling between the autonomous agents and their embedding in a physical space. In addition to informational interactions between agents when exchanging information, there are mechanical interactions between agents, whereby strength of these mechanical interactions decreases with the physical distance between the interacting agents. For example, consider the case where a beam buckling due to a heavy load is controlled by an array of smart piezoelectric actuators which sense the state of the straightness of the beam and piezoelectric actuators that operate to prevent buckling. The action of one piezoelectric actuator imparts displacement and stresses to a local region of the beam. These stresses and strains are then transmitted to other actuators/sensors in neighboring regions through the physics of rigid media.

An important aspect of distributed control of smart matter is designing a suitable organization for the agents, such as, for example, how individual decisions are influenced by the behavior of other agents in the system. Because the detailed characteristics of the system can vary due to failures and environmental changes, any initial organization for the agents may not remain appropriate later on. Hence, adding a learning mechanism can help the agents respond and adapt to these changes by altering their organizational structure.

In one exemplary embodiment, a powerful learning technique uses resource markets for the agents. As in economics, the use of prices provides a flexible mechanism for allocating resources, with relatively low information requirements. For example, a single price generally summarizes the current demand for each resource. These markets allow a flexible reward mechanism to compare different control strategies and organizations. In this way, the multiagent system is able to take advantage of the fact that markets enable a simple and powerful discovery process. New methods for selecting trades can be tried by a few agents acting as consumers and a few agents acting as producers of a given resource. If successful relative to existing approaches, such new methods will gradually spread to other agents. Such a learning mechanism helps the system discover those organizational structures that lead to improved performance and adaptability.

In practice, the market mechanism for learning could be implemented in a variety of ways. In various exemplary embodiments that most directly implement the market mechanism, the agents slowly vary their connections to other agents. Each agent notes the consequent change in that agent's net wealth as the connections are varied. In this situation, the markets serve to implement system parameter adjustments in a manner that is more flexible and robust than simple global hill-climbing or gradient-descent techniques. One significant illustrative embodiment uses markets to compare general control strategies for the agents. It should be appreciated that a part of the general control strategy could include determining which of other agents have information that is worth using. This fully utilizes the market discovery process by allowing new strategies to be incrementally added to the system. The systems and methods of this invention seek to determine which market implementation is best suited to various control situations.

In various exemplary embodiments, the agents are endowed with the ability and desire to make an anticipatory determination which, like people in real markets, leads to trading local and present optimality for future global improvement. These exemplary embodiments of the systems and methods according to this invention can be used with several systems in which agents have the capability of forming expectations about future events and the ability to use such expectations to adjust the present behavior of those agents. Moreover, market mechanisms facilitate the learning of control strategies through coordinating anticipatory choices as applied to smart matter.

Various other exemplary embodiments of the systems and methods according to this invention implement machine learning by optimizing simple parameters describing properties of the system. In various exemplary embodiments, a controller, to control complex dynamical systems, has an appropriate model of the dynamic system and the effects of various control inputs on the dynamic system. While parts of a particular dynamic system can often be modeled, unmodeled effects invariably complicate the control problem. Controllers can therefore be designed to both consider a priori knowledge about the system, and to adaptively incorporate new knowledge about the system through developing new models and/or adapting existing models. Such model selection can be performed by the system designer who, by using experience and pattern recognition abilities, selects appropriate models for predicting dynamic system behavior. Bayes statistics can also be used to guide model selection. However, that approach tends to be computationally and data intensive to achieve reasonable results. Incorporating prior knowledge about models is also very difficult in the Bayes approach.

In various exemplary embodiments of the systems and methods according to this invention, models for use in predicting and controlling dynamic systems are selected based on, i.e., by using, market dynamics. In these exemplary embodiments, the model selection process is robust, intuitive, able to straightforwardly incorporate prior knowledge, and can appropriately control smart matter, i.e., control systems where many sensors, actuators and controllers are simultaneously operating.

Market-based model selection is based on the premise that models that successfully predict the future based on the present states of the dynamic system and of the control units ought to be rewarded while those models that poorly predict future system behavior should not contribute as heavily to future system predictions. Models selected through market based competition assumes more of the control and/or prediction responsibility. Thus, in various exemplary embodiments of the systems and methods according to this invention, a number of models are allowed to jointly attempt to predict and/or control the future behavior of the dynamic system. If a particular model is more successful than the current mix of models in predicting and/or controlling the dynamic system, the weighting of the more successful model is increased at the expense of those models which perform less successfully. An analogy is investors who successfully predict the future price of a stock or a commodity are rewarded for providing useful predictive information to the economy about the future costs of that stock or commodity. In the next time frame, such successful investors have more money to invest, while those investors who fail to predict the market are penalized by having less money to invest.

FIG. 1 is a flowchart outlining one exemplary method for making market-based model selection. As shown in FIG. 1, beginning in step S1100, control continues to step S1200, where each of N different system performance control models is assigned a weight $w_i$ such that the sum of $w_i$ from i=1 to N equals 1. As step S1200 is repeated, a weight $w_i$ may be reassigned as discussed herein. Next, in step S1300, for the next interval, a certain fraction a of each weight $w_i$, is "invested" or wagered. That is, for the $i^{th}$ model, the $i^{th}$ model's weight becomes $aw_i$, where 0<a<1. This fraction may be the same for each model or may depend on the weight itself. In various exemplary embodiments, models with large weights may be required to make larger investments, i.e., use larger values for a. Operation then continues to step S1400.

In step S1400, all of the N different system performance control models are run to determine the predicted results of each model. Given the current state of the system x(t), where x is a vector, and the control input u(t), where u is also a vector, each model i attempts to predict the future state of the system $x_i(t+\Delta t; x(t), u(t))$ at the end of the next time interval Δt. Next, in step S1500, actual system performance is measured or otherwise determined after the next time interval Δt has elapsed. Then, in step S1600, the results of each predicted system performance model are compared to actual system performance resulting after the next time interval Δt has elapsed. Operation then continues to step S1700.

In step S1700, a determination is made whether the prediction error for any of the N models is greater than the noise variance. In step 1700, if the prediction error for at least one model is greater than the noise variance, operation continues to step S1800. If not, control returns to step S1200, where each system control model is reassigned a new weight $w_i$, and the process continues for steps S1300–S1700.

In step S1800, the results of the prediction of each model are ranked based on prediction errors. Next, in step S 1900, the invested amount, $$\sum_{i=1}^{N} aw_i,$$

obtained from all N of the models, is split between the N models according to how well each model predicted the behavior of the system. For example, if the prediction error in the $i^{th}$ model is $e_i(t+\Delta)=x(t+\Delta)-x_1(t), u(t)$, then the fraction of the amount $$\sum_{i=1}^{N} aw_i$$

going to the $i^{th}$ model is $$\Delta w_i = a\left[\frac{1/(e_i^2+\sigma^2)}{\sum_{j=1}^{N} 1/(e_j^2+\sigma^2)}\right]$$

where $\sigma^2$ is an estimate of the noise variance. That is, there should be an incentive to predict better than the noise. In this case, the new model weights would be given by the difference between the amount invested and the return on investment. In other words:

$$w_i^{new} = (1-a)w_i^{old} + a\left[\frac{1/(e_i^2+\sigma^2)}{\sum_{j=1}^{N} 1/(e_j^2+\sigma^2)}\right]$$

This preserves the fact that the weights sum to 1.

At any given time, the state of the system may be predicted, for example, jointly by:

$$\hat{x}(t+\Delta t) = \sum_{i=1}^{N} w_i \hat{x}_i\left(t+\Delta t;\, x(t),\, \bar{u}(t)\right)$$

Moreover, each model may also have a number of adjustable parameters that can be revised to maximize the accuracy of the models' predictions. As a given model adjusts its investment strategy by varying one or more of the adjustable parameters, that model will be rewarded. Operation then continues to step S2000.

In step S2000, the control strategy implemented by each of the distributive control agents is executed based on the amount invested among the models based on the determined ranking. Then, in step S2100, a determination is made whether to reevaluate the system by repeating the market-based selection process. Any number of reevaluations may be made and the time period(s) during which reevaluations are made may vary. If no reevaluation is chosen, execution continues to be based on the ranking determined in step S1800. Otherwise, control re-starts the market-based selection process by returning to step S1200.

Many other market based selection strategies for prediction are possible. One possibility is that the weight changes of the previous section could be modified to include the previous importance of weights by modifying the previous weight update formulas to become $$\Delta w_i = a\left[\frac{w_i/(e_i^2+\sigma^2)}{\sum_{j=1}^{N} w_j/(e_j^2+\sigma^2)}\right] \quad \text{and}$$

$$w_i^{new} = (1-a)w_i^{old} + a\left[\frac{w_i^{old}/(e_i^2+\sigma^2)}{\sum_{j=1}^{N} w_j^{old}/(e_j^2+\sigma^2)}\right]$$

This modification would be less aggressive in changing weights to successive models but offer more stability in the presence of large noise fluctuations.

A second illustrative example involves expanding the definition of error to not only predict the next time step but the next m steps. The model that predicts a weighted integral of the squared error would be weighted more heavily than one that does less well. Such an approach would be roughly analogous to a linear quadratic observer.

Other embodiments entail changes in the way various models are re-weighted for successful prediction. The most extreme would be to assign all prediction to the one that does the best and none to the others. This approach would yield a prediction that was better than a less aggressive re-weight strategy but have the disadvantage of discontinuous changes in prediction leading to possible limit cycles and chattering in control.

A truly robust, versatile and adaptable market based model selection would involve a procedure by which models that consistently fail to predict the future state are removed (models go bankrupt) and the computational resources are devoted to creating new models that attempt to compete with the best of the existing models. The removal and addition of models can be accomplished requiring a threshold weight below which a model is no longer considered in order to eliminate bad models and wasted computation. New models can be generated using known model families or genetic programs which more blindly generate new models that can attempt to compete in the model market place.

Market based model selection for control is almost identical to prediction except that a combined control is generated by $$\bar{u}(t) = \sum_{i=1}^{N} w_i \bar{u}(t)$$

where $u_i(t)$ is the control action the $i^{th}$ controller would have taken by itself. The error between the desired state and the resulting state is used to adjust the control weighting according to the weight of the responsible controller. Controllers which have a large weights are more responsible for the overall error than ones with smaller weights. Therefore, such large weight controllers should receive correspondingly larger rewards and losses, i.e., correspondingly large increases and decreases in the control weights $w_i$.

Many other market based model selection strategies for control are possible. One example would be to weight controls not just on the error with respect to the desired state but include a term favoring controllers that accomplish control with a minimum amount of actuation. In such a case, $e_i^2$ in the previous equations can be replaced by $e_i^2+u_i^2$ where $u_1$ is the actuation requested by the ith controller to achieve the desired state at the next time step. Further possible market based selection ideas include adjusting weights by the minimum of the expected error and actuation over a finite time horizon. The latter would be roughly analogous to a Linear Quadratic Regulator type control criterion. Many of the ideas in the market for prediction modeling have direct analogs in the market for control The methods and systems of the various exemplary embodiments of this invention have several distinct advantages over conventional model selection methods and systems. For example, prior knowledge can easily be incorporated through the choice of the initial weights and the initial models entered into the investment competition. The computational burden is relatively small. Models can be added or removed. The selection procedure can proceed toward a new model selection as models are altered, model selection calculations can be performed using distributed analog computation; and a central processor may not be required.

FIG. 2 shows one exemplary embodiment of a system 200 according to this invention. In particular, the system 200 is used to control an air conditioning system 300, for a large residential building or commercial building 1000. Distributed control of the air conditioning system 300 is handled by four distributed control agents 210, 220, 230 and 240 of the control system 200. Each distributed control agent 210–240 manages the smart matter air conditioning controls of a particular air conditioning zone 310–340, respectively. FIG. 3 shows that each air conditioning zone 310–340 has (1) a condenser 311, 321, 331 and 341, respectively; (2) an air handling unit 312, 322, 332 and 342, respectively; (3) a filtration unit 313, 323, 333 and 343, respectively; (4) a humidification unit 314, 324, 334 and 344, respectively; (5)

flow control elements 315, 325, 335 and 345, respectively; and (6) various sensors 316, 326, 336 and 346, respectively, including temperature sensors, humidity sensors, and/or air flow sensors.

It should be appreciated that, while FIGS. 2 and 3 show four air conditioning zones 310–340, in practice, a smaller or larger number of zones and agents could be used. However, it should be appreciated that the relationship between the number of agents and the number of control zones can vary. For example, one agent can control more than one zone, or one zone may be controlled by more than one agent. An adaptive controller 400 is connected to adaptive control agents 210–240. The adaptive controller 400 evaluates various control models and runs each controller 210–240 in accordance with a selected model or a selected mix of two or more models. The control models are chosen to achieve a desired set of values of temperature, humidity, and air flow rates in different locations in each zone 310–340. Each control model is chosen to achieve these results.

In one exemplary embodiment of the systems and methods according to this invention, the building 1000 in which the air conditioning system 300 is located is a four story building 1000 which has four large rooms or offices on each floor. Each floor is a zone, and each zone has four rooms.

In this exemplary embodiment, each zone 310–340 has one distributive control agent 210, 220, 230 or 240 that controls that zone 310–340. Each agent 210–240 operates using a particular model. As an example, a first model, employed by a first distributive control agent 210, may place a significant amount of emphasis on airflow control and less emphasis on temperature and humidification control. A second model, employed by distributive control agent 220, may place a significant amount of emphasis on ambient temperature and humidification control and less emphasis on airflow control. A third model, employed by distributive control agent 230, is similar to the first model, but the third model may also take into consideration the movement of cold air from upper floors to lower floors. A fourth model, employed by distributive control agent 240, is similar to the second model but may also take into consideration the rising of warm ambient air from lower floors to higher floors. A fifth Model, also used by the first and second distributive control agents, is similar to the first model but may also take into consideration ambient horizontal air currents from the front to the back of the building 1000 on all four floors due to heat sources located within the building 1000. Additional models may also be used.

In FIG. 2, the adaptive controller 400, which may be a microprocessor or other distributed control device, is connected through a first interface 410 with the distributed control devices 210–240, and is used to control the distributed control devices 210–240. Adaptive controller 400 determines which control model or mix of control models to use to run each distributive control agent 210–240. The distributed control devices 210–240 are connected to each other and to the air conditioning zones 310–340 of the building 1000 via a second interface 420. Using the adaptive controller 400, information can be exchanged between various ones of the zones 310–340 and/or various ones of the adaptive control agents 210–240, and between adaptive controller 400 and various ones of the adaptive control agents 210–240. Similarly, various ones of the zones 310–340 can be controlled by various ones of the adaptive control agents 210–240, while various ones of the adaptive control agents 210–240 can be controlled by the adaptive controller 400.

This invention may be applied to smart matter sensors which are part of a physically connected system such as, for example, a photocopier, or smart sensors which are part of systems which are not physically connected, such as, for example, traffic control systems for various types of vehicles, including aircraft, ground based motor vehicles, trains, ships, etc. In physically connected systems, the interaction between various parts of the system which have smart sensors is mechanical in nature, whereas in other systems, such as, for example, traffic control systems, interactions between various parts of the system are not mechanical. Rather, they may include sensing reaction of one vehicle to action of another vehicle, e.g., turning, slowing, accelerating, stopping, etc. of another vehicle.

Following the steps set forth in FIG. 1, the adaptive control apparatus of FIG. 2 and the agents 210–240 can be used to iteratively control the air conditioning system 300 of the building 1000 shown in FIG. 2 using a market based control approach.

While this invention has been described in conjunction with the exemplary embodiments set forth above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. In a system using multiple smart matter dynamic controllers, each controller comprising one or more actuator-sensor pairs, a method for dynamic control of the system, comprising:

representing each controller using one or more control system models;

executing each of control system models and predicting future performance of the system after one or more time intervals as a weighted sum of individual predictions of each model for each controller;

measuring actual performance of the system after said one or more time intervals;

for each controller, computing a prediction error as the difference between the predicted performance and the measured actual performance of the subsystem controlled by the controller;

adjusting the weights of at least two control system models based on their prediction errors relative to the prediction errors of other models wherein adjusting the weights of at least two control system models includes increasing a weight of at least one control system model in the plurality of control system models relative to a weight of at least one other model; and using the control system models and the adjusted weights in the dynamic controllers for dynamic control of the system during next time interval, wherein adjusting the weights of at least two control system models includes defining a fraction $a_i$ of a weight $w_i$, of an $i^{th}$ model, where $0<a_i<1$, which will be adjusted for the next time interval, wherein each model is used to predict, at a current time t, a future state of the system at a later time ($t+\Delta t$):

$$x_i(t+\Delta t;x(t),u(t)),$$

where x(t) is a state of the system at time t,$x_i(t+\Delta t)$ is a state of the system at time $t+\Delta t$ estimated by the $i^{th}$ model, and u(t) is a control input at time t, the method further comprising assigning a new weight $w_i^{new}$ for the $i^{th}$ model according to the formula $$w_i^{new} = (1-a)w_i^{old} + a\left[\frac{1/(e_i^2+\sigma^2)}{\sum_{j=1}^{N} 1/(e_j^2+\sigma^2)}\right]$$

where $w_i^{old}$ is a previous weight for the $i^{th}$ model, $e_i$ is a prediction error of the $i^{th}$ model, and $\sigma^2$ is a noise variance of the multiple actuator-sensor smart matter dynamic control system.

2. The method of claim 1, wherein the plurality of control system models comprises N control system models and each of the N control system models is initially assigned a weight $w_i$ such that $$\sum_{i=1}^{N} w_i = 1.$$

3. The method of claim 1, further including repeating the predicting, determining and adjusting steps for successive time intervals.

4. The method of claim 1, further including summing prediction error over a multiple intervals for each prediction model for use in adjusting the weights.

5. The method of claim 1, further comprising adding new models.

6. Smart matter dynamic controllers for a system, each controller comprising one or more actuator-sensor pairs, each dynamic controller further comprising:

means for representing the controller using one or more control system models;

means for executing each of control system models and predicting future performance of the system after one or more time intervals as a weighted sum of individual predictions of each model for each controller;

means for measuring actual performance of the system after said one or more time intervals;

means for computing a prediction error as the difference between the predicted performance and the measured actual performance of the subsystem controlled by the controller;

means for adjusting the weights of at least two control system models based on their prediction errors relative to the prediction errors of other models wherein adjusting the weights of at least two control system models includes increasing a weight of at least one control system model in the plurality of control system models relative to a weight of at least one other model; and means for using the control system models and the adjusted weights in the dynamic controllers for dynamic control of the system during next time interval, wherein means for adjusting the weights of at least two control system models includes means for defining a fraction $a_i$ of a weight $w_i$, of an $i^{th}$ model, where $0<a_i<1$, which will be adjusted for the next time interval, wherein the means for increasing a weight assigns a new weight $w_i^{new}$ for the $i^{th}$ model according to the formula $$w_i^{new} = (1-a)w_i^{old} + a\left[\frac{1/(e_i^2+\sigma^2)}{\sum_{j=1}^{N} 1/(e_j^2+\sigma^2)}\right]$$

where $w_i^{old}$ is a previous weight for the $i^{th}$ model, $e_i$ is a prediction error of the $i^{th}$ model, and $\sigma^2$ is a noise variance of the multiple actuator-sensor smart matter dynamic control system.

7. The controllers of claim 6, wherein the plurality of control system models comprises N control system models, and each of the N control system models is initially assigned a weight $w_i$ such that $$\sum_{i=1}^{N} w_i = 1.$$

8. The controllers of claim 6, wherein each model is used to predict, at a current time t, a future state of the system at a later time (t+Δt):

$$x_i(t+\Delta t; x(t), u(t)),$$

where x(t) is a state of the system at time t, $x_i(t+\Delta t)$ is a state of the system at time t+Δt estimated by the $i^{th}$ model, and u(t) is a control input at time t.

9. Smart matter dynamic controllers for a system, each controller comprising one or more actuator-sensor pairs, each dynamic controller further comprising:

one or more control system models;

an execution circuit for executing each of control system models and predicting future performance of the system after one or more time intervals as a weighted sum of individual predictions of each model for each controller;

a measurement circuit for measuring actual performance of the system after said one or more time intervals;

a predicting circuit for computing a prediction error as the difference between the predicted performance and the measured actual performance of the subsystem controlled by the controller;

an adjustment circuit for adjusting the weights of at least two control system models based on their prediction errors relative to the prediction errors of other models wherein adjusting the weights of at least two control system models includes increasing a weight of at least one control system model in the plurality of control system models relative to a weight of at least one other model; and an implementation circuit that uses the control system models and the adjusted weights in the dynamic controllers for dynamic control of the system during next time interval;

wherein adjusting the weights of at least two control system models includes defining a fraction $a_i$ of a weight $w_i$, of an $i^{th}$ model, where $0<a_i<1$, which will be adjusted for the next time interval, wherein the weight increasing circuit assigns a new weight $w_i^{new}$ for the $i^{th}$ model according to the formula $$w_i^{new} = (1-a)w_i^{old} + a\left[\frac{1/(e_i^2+\sigma^2)}{\sum_{j=1}^{N} 1/(e_j^2+\sigma^2)}\right]$$

where $w_i^{old}$ is a previous weight for the $i^{th}$ model $e_i$ is a prediction error of the $i^{th}$ model, and $\sigma^2$ is a noise variance of the multiple actuator-sensor smart matter dynamic control system.

10. The controllers of claim 9, wherein the plurality of control system models comprises N control system models, and each of the N control system models is initially assigned a weight $w_i$ such that $$\sum_{i=1}^{N} w_i = 1.$$

11. The controllers of claim 9, wherein each model is used to predict, at a current time t, a future state of the system at a later time (t+Δt):

$$x_i(t+\Delta;x(t),u(t)),$$

where x(t) is a state of the system at time t, $x_i(t+\Delta t)$ is a state of the system at time t+Δt estimated by the $i^{th}$ model, and u(t) is a control input at time t.

* * * * *